UNITED STATES PATENT OFFICE.

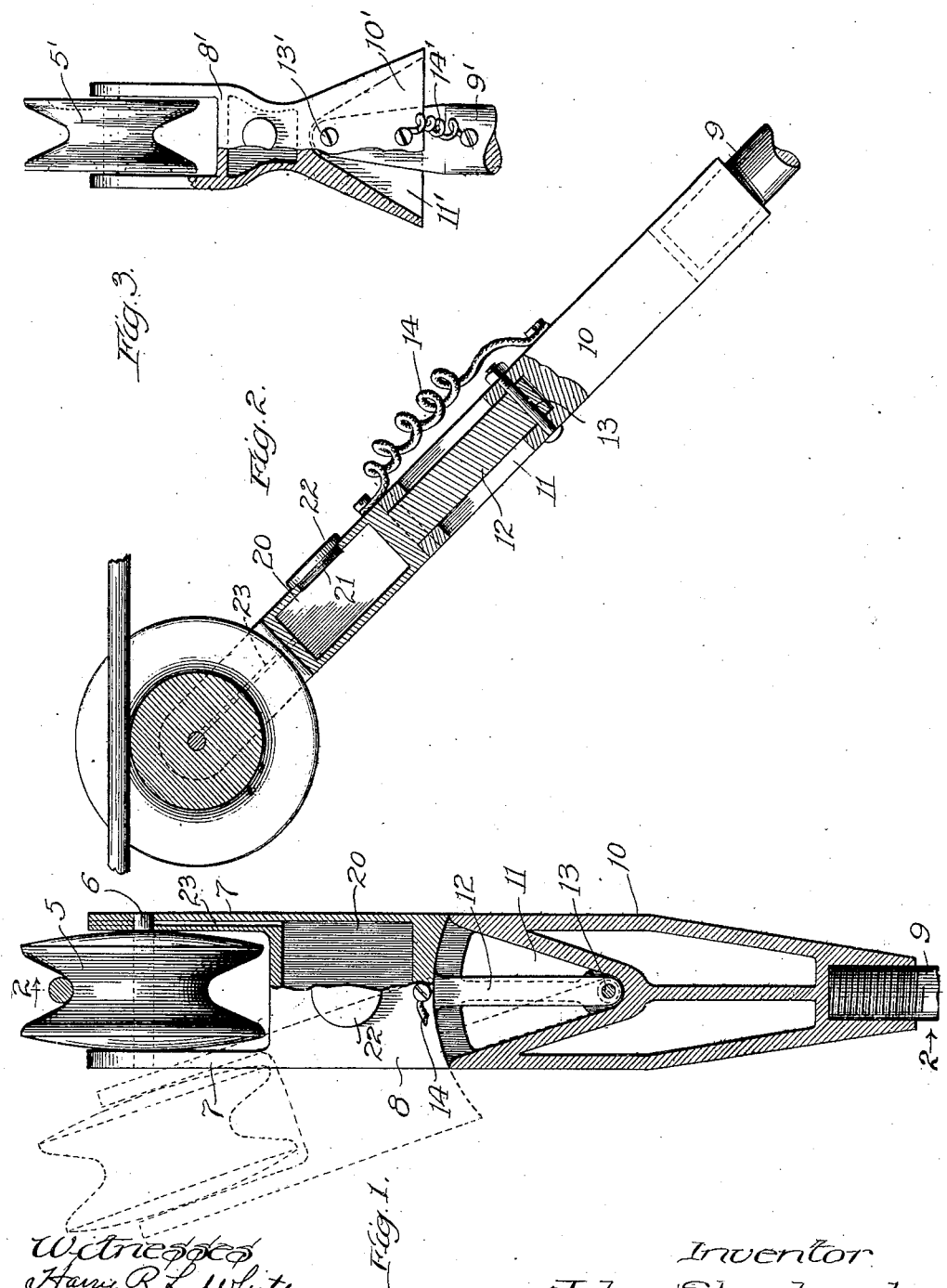

JOHN SHEPHERD, OF CHICAGO, ILLINOIS, ASSIGNOR OF ONE-HALF TO JOHN SHEPHERD, OF CHICAGO, ILLINOIS.

TROLLEY.

No. 920,674.   Specification of Letters Patent.   Patented May 4, 1909.

Application filed September 3, 1907. Serial No. 391,050.

*To all whom it may concern:*

Be it known that I, JOHN SHEPHERD, a citizen of the United States, residing at Chicago, in the county of Cook and State of Illinois, have invented certain new and useful Improvements in Trolleys, of which the following is a specification.

My invention relates to improvements in trolleys, and has among its salient objects to provide a trolley so constructed as to minimize the tendency to "jumping" or running off of the trolley wire; and one wherein efficient and adequate oiling means is provided.

In practice it is customary to mount the trolley wheel upon a harp directly and rigidly connected with the trolley pole, and to rely for lateral movement of the trolley wheel entirely upon the mechanism at the base of the pole. Thus, owing to the relatively great mass of the apparatus that must be moved to shift the trolley wheel laterally, and permit it to follow the curvature of the trolley wire around curves in the road, the trolley wheel frequently jumps from the trolley wire on curves, for the reason that when the car is turned by the track the trolley pole, usually carrying the wheel far back of the center of the car, tends so strongly to maintain its normal position in alinement with the longitudinal axis of the car that the wheel runs diagonally with respect to the trolley wire and throws the trolley wire out of its groove. I have found that this difficulty, constantly encountered in the operation of trolley lines, may be minimized and practically overcome by the provision of a pivotal joint in the trolley support, intermediate the base and the trolley wheel, and preferably near said wheel, to permit lateral movement of the trolley wheel to a considerable extent without movement of the bulk of the pole or the base. To attain this end I preferably provide adjacent the trolley wheel a tongue and flaring-socket joint, whereof one element is provided by the construction of the trolley harp, and wherein the tongue and socket members are pivotally connected on an axis at right angles to the axis of rotation of the trolley wheel, in such manner as to permit deflection of the trolley harp to one side or the other out of alinement with the pole, and consequent lateral movement of the trolley wheel, with respect to the trolley pole proper and its connected appliances, without permitting fore-and-aft movement of the harp out of alinement with the pole.

In the drawing, constituting a part hereof, wherein I have illustrated two embodiments of my invention; Figure 1 is a front view, partly in section and partly in elevation, of a trolley structure embodying my invention; Fig. 2 being a section on line 2—2 of Fig. 1, and; Fig. 3 is a view, partly in section and partly in elevation, showing a modified embodiment of my invention.

Throughout the several figures like numerals of reference refer always to like parts.

Referring now specifically to Figs. 1 and 2, 5 indicates a trolley wheel mounted upon the usual horizontal axle 6, bearing in the arms 7—7 of a harp, indicated as a whole by the numeral 8.

9 indicates in general a fragment of the trolley pole proper, with respect to which the wheel carrying part is pivotally connected for lateral movement.

Specifically 10 indicates a head fitting upon the trolley pole, providing in its end an inwardly tapering socket 11, preferably of uniform height, (by which is meant the distance between its front and back faces) and with its lateral dimensions gradually and uniformly tapering from mouth to bottom.

12 indicates the tongue, carried by, projecting from, and preferably made integral with the harp 8, said tongue being arranged in the socket 11 and pivoted therein by a bolt 13 at a point adjacent the bottom or narrow end of the socket.

As illustrated in the drawing, the tongue should be proportioned to fit snugly between the front and back faces of the socket, to permit practically no movement of the trolley wheel with respect to pole 9 and head 10 in a fore-and-aft direction, but to permit free pivotal movement of the trolley harp and wheel laterally with respect to the head 10 and pole 9, as indicated in dotted lines in Fig. 1.

For providing high electrical conductivity between the harp 8 and head 10 a bond wire 14 is suitably connected at opposite ends to the harp and head respectively.

In Fig. 3 it will be obvious that the trolley harp 8' is provided at its bottom with a flaring skirt 10' in which is formed a socket 11' tapering from mouth to top in a transverse direction and of uniform height or dimension in a direction at right angles to the axis of rotation of the wheel 5'. The trolley pole 9' is preferably provided with a tapering end which is inserted directly in the socket 11' and pivoted therein by a bolt 13'. A bond wire 14' is connected between the skirt 10' and the trolley pole.

It will be observed that in both of the constructions shown there is a pivotal connection between the part of the trolley structure for connection with the car, namely the trolley pole 9 or 9', and the wheel carrying harp, whereby the trolley wheel may deflect out of alinement with the pole laterally in either direction, to an extent limited by the sides of the socket, but is maintained constantly in alinement with the pole in a fore-and-aft direction.

It will further be apparent to those skilled in the art that the same idea might be embodied in other particular mechanical forms; and I have herein shown two embodiments of my invention of different appearance and construction for purposes of disclosure of the ease with which the specific mechanical structure may be varied without departure from the spirit and scope of my invention.

Further I prefer, although it is not essential, that the trolley harp be provided with an internal oil reservoir, connected with the bearings of the trolley axle, whereby the latter may be readily and conveniently oiled.

Specifically 20 indicates a reservoir chamber formed in the body of the harp 8, having therein an inlet opening 21 normally closed by a screw cap 22. 23 indicates a duct leading from the reservoir 20 through each arm 7 of the harp to the bearing points of axle 6, so that it will be apparent that the reservoir 20, being filled, the oil is applied to each bearing of axle 6 every time the trolley is pulled down to a position to give the ducts 23 a downward inclination from the reservoir to the bearing.

While I have herein described in some particularity specific embodiments of my invention, it will be understood that I do not intend to limit myself to the precise forms disclosed, as many other embodiments will readily occur to those skilled in the art.

Having thus described my invention, what I claim and desire to secure by Letters Patent, of the United States, is:

In a trolley, a pole, a head having therein a socket with its side walls tapering inwardly and the edges of its face walls curved convexly, a harp providing a body, curved at its base to conform with the edges of the head, and of substantially the width and thickness of the head, a tongue projecting from said body into the socket, a bolt whereon said tongue pivots at the center wherefrom said curved edges of the head and harp are struck, and a trolley wheel mounted in the harp.

In testimony whereof I hereunto set my hand in the presence of two witnesses.

JOHN SHEPHERD.

In the presence of:
MARY F. ALLEN,
GEO. T. MAY, Jr.